Sept. 9, 1958　　　　E. R. BILLINGTON　　　2,850,900
PRESSURE INDICATOR
Original Filed March 3, 1955　　　　　　　2 Sheets-Sheet 1
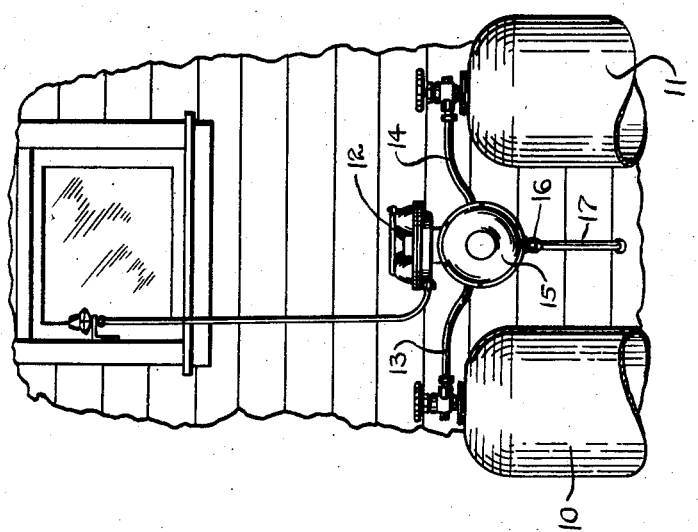
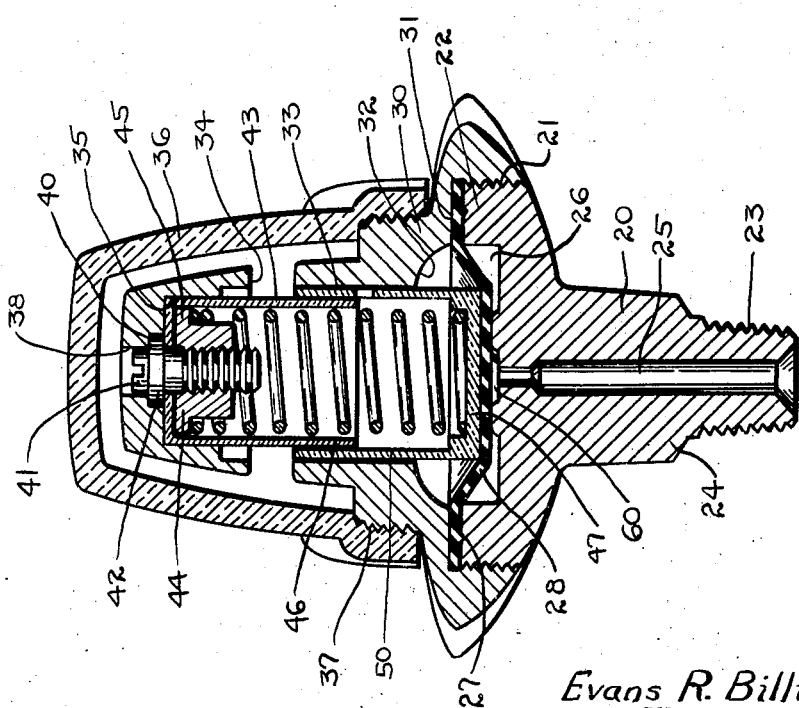
INVENTOR.
Evans R. Billington
BY
Atty.

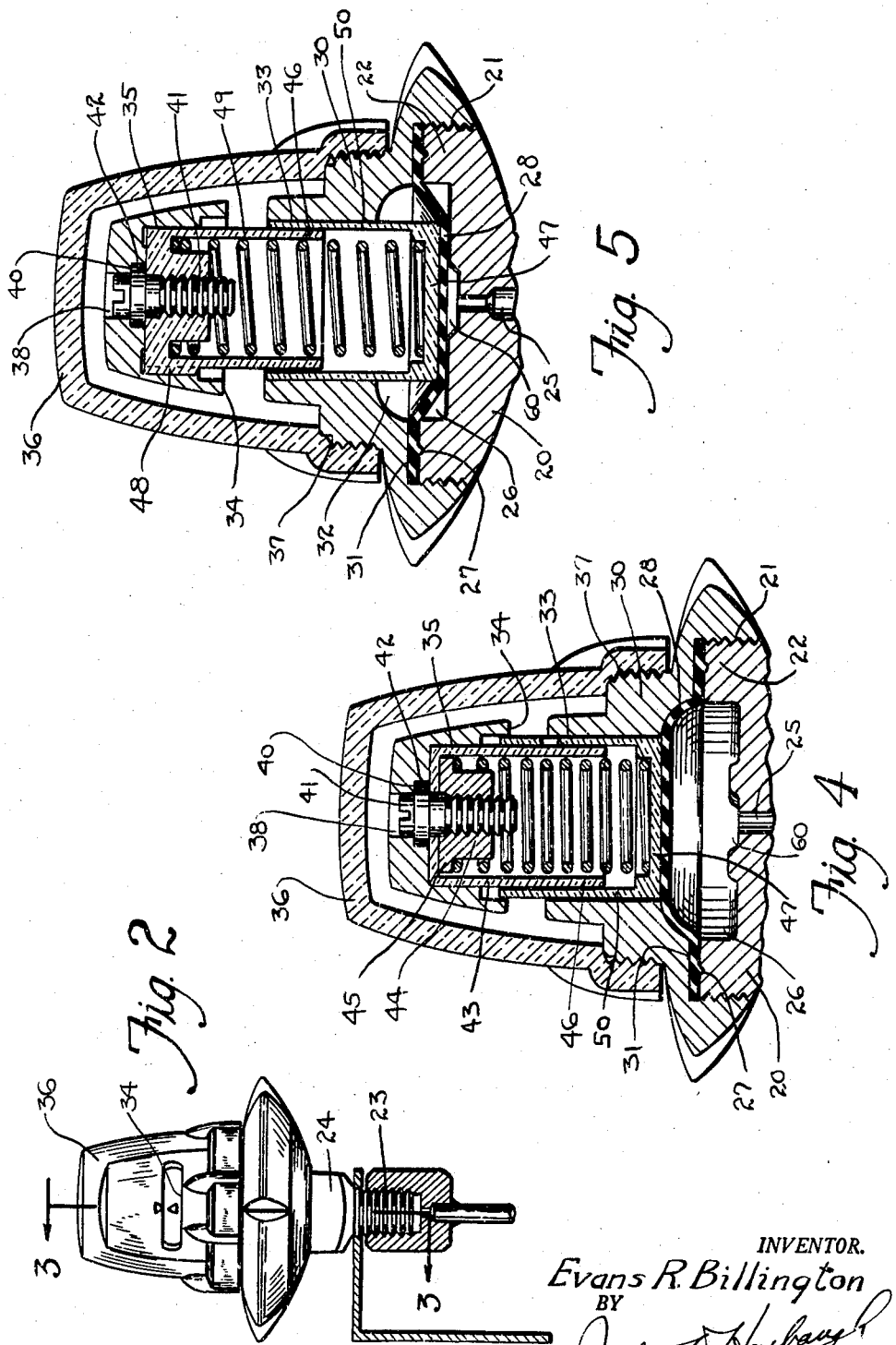

United States Patent Office 2,850,900
Patented Sept. 9, 1958

2,850,900

PRESSURE INDICATOR

Evans R. Billington, Chicago, Ill., assignor to The Bastian-Blessing Company, Chicago, Ill., a corporation of Illinois Continuation of application Serial No. 491,890, March 3, 1955. This application August 20, 1957, Serial No. 679,238

8 Claims. (Cl. 73—406)

The present invention relates to pressure differential indicators and more particularly to devices used in the liquefied petroleum gas industry for indicating alternate gas dispensing service conditions.

In the use of liquefied petroleum gas domestically, by way of example, it is the practice to supply a home with two storage tanks and from one tank dispense at a high pressure until it is empty and then dispense from the other tank at a lower pressure until the empty tank is replaced by a full one. Such a system requires that the user watch to see when the high pressure tank is empty and very often this is not noticed until it is too late to replace the empty tank before the tank dispensing at the lower pressure is empty.

The difficulty of running out of gas arises from the fact that the storage tanks are generally located remotely or outside the dwellings at safe places, where people are not likely to pass or notice them regularly. In those instances where the tanks are intentionally located where they cannot be overlooked, they are in the way and very often are objected to as being unsightly.

Moreover, in order to have the gas service pressure in the dwelling as constant as possible, the effective pressure dispensing differential required between the tanks is so small that detection of the empty condition of one of the tanks may not be clearly indicated by conventional arrangements, even though adequate observation by the householder is maintained.

One of the objects of the present invention is to provide an indicator which can be located any place desired where it will be unobtrusive and seen repeatedly every day, regardless of the location of the storage tanks, yet will operate positively upon a narrow range of pressure dispensing differentials.

A further object is to provide an indicator which will be operative under all weather conditions and readily visible from any angle.

A further object is to provide an improved pressure differential responsive device which alters its indication by a wide range of movement with a positive snap-like action that is not affected by lock-up pressures normally experienced in pressure regulating systems in the liquefied petroleum gas industry.

The invention is also characterized by an indicator arrangement which does not impose a load upon the system for its operation.

A further object of the invention is to provide an indicator construction which is inexpensive to make, adjust and install, foolproof in operation, and easily understood by the user in operation.

These being among the objects of the invention, other and further features of the invention will be apparent from the description, the drawings relating thereto and the appended claims.

This application is a continuation-in-part of my co-pending application Serial No. 480,693, reference to which is hereby made, and a continuation of my co-pending application Serial No. 491,890 now abandoned.

In the drawings:

Fig. 1 is a front view of a liquefied petroleum gas dispensing system installation embodying the invention;

Fig. 2 is an enlarged or close-up view of the indicator shown in Fig. 1;

Fig. 3 is an enlarged sectional view taken vertically upon the line 3—3 in Fig. 2 with the indicator indicating low-pressure tank conditions;

Fig. 4 is a view similar to Fig. 3 showing the position of parts under high-pressure tank conditions, and Fig. 5 is a view similar to Fig. 4 showing another embodiment of the invention.

Referring now to the drawings in further detail, a liquefied petroleum gas dispensing system is illustrated in Fig. 1 where two storage tanks 10 and 11 are removably connected to a changeover or throwover first stage regulator assembly 12 as described in said application by copper pigtails 13 and 14, respectively. There are two pressure regulating valves in the assembly, one for each pigtail inlet, and the two valves discharge into a common valve chamber. One valve is selectively set to deliver a higher pressure, such as 12 pounds per square inch gauge, while the other is set to deliver a lower pressure such as six pounds per square inch, as described in said application, from tanks where pressures vary from 15 to 150 p. s. i. As long as there is a supply of gas in the container for the 12 p. s. i. regulator, the valve chamber will be held at 12 p. s. i. and the 6 p. s. i. regulator will be held closed. Thus the 12 p. s. i. tank operates on "service" while the other is held as "stand-by" or reserve. Then when the service tank is depleted the pressure in the valve chambers falls and the 6 p. s. i. regulator takes over and gas is supplied from the "reserve" tank until the empty tank is replaced with a full one, at which time the working characteristics of the two regulators are manually reversed or "changed over" and the operating "reserve" tank becomes the 12 p. s. i. "service" tank and the new tank becomes the 6 p. s. i. "reserve" tank to repeat the above-mentioned dispensing cycle.

The output from the regulators is conducted to a second stage regulator 15 through the connection 16 and conducted from there to the appliances in the house through the service conduit 17 at a pressure of 11 inches of water column.

Connected into and responsive to the pressure in said common chamber is the indicator embodying the invention to indicate whether the pressure in the chamber is 12 or 6 p. s. i. and thereby indicate by suitable markings whether the system is operating on the "service" or "reserve" tank. If it is operating on the reserve tank, then indicator indicia warn that it is time to call the distributor for a replacement tank.

The indicator comprises a body 20 which is mushroom in shape and threaded as at 21 around the top 22 and as at 23 at the lower end of the stem portion 24. The threads preferably are concentric with a passageway 25 extending centrally through the body. A recess 26 is provided in the upper face of the top to provide working space for the diaphragm and the marginal edge of the recess is machined to have a circular groove 27 therein. An elastomer diaphragm 28 marginally rests upon the rim of the recess and extends over the groove 27.

A bonnet 30 is threaded to the body at 21 and has a shoulder 31 marginally engaging the diaphragm to compress the diaphragm bodily at its edge into the groove 27 to thereby clamp it in sealed relationship. The bonnet otherwise is correspondingly recessed as at 32 above the center of the diaphragm to provide working space above the diaphragm and is bored out to a large diameter cavity 33 in its top. Wide windows 34 are cast in opposite walls of the cavity. Spaced above the windows the cavity is of reduced diameter as at 35. A transparent Lucite bell or hood 36 is threaded to the bonnet at 37 to cover the windows so that the windows are visible through it and also any elements behind the windows that are located in the cavity. The thread at 37 includes a truncated or interrupted thread contour that permits restricted communication with the atmosphere for the flow of air to cushion the action of the diaphragm.

At its upper end the bonnet is apertured at 38 and provided with a downwardly facing shoulder 40 to receive a screw 41 therein as supported against upward displacement by a flange 42. The depending threaded end of the screw in the embodiment shown in Fig. 4 receives an inverted cup member 43 thereon and a nut 44 externally flanged as at 45. The flange supports the cup in an elevated position with the apron 46 thereof extending to a point below the windows. Preferably the cup is made of red translucent plastic and supports the nut against relative rotation. In the embodiment shown in Fig. 5, the inverted cup and nut are formed as an integral member 49. In this embodiment, however, a guiding land and groove arrangement 48 is provided to prevent rotation when the screw is turned.

Reciprocably telescoping over the apron 46 between the apron and the windows is the cylindrical wall 50 of an upright cup made of green plastic with the base 47 thereof resting on the diaphragm 28.

The reduced portion 35 of the bonnet snugly engages the base of the inverted cup member 43 so that the apron is held in correct position to provide constant clearance between it and the bore 33 so that the wall 50 may reciprocate freely therein. As shown in Fig. 3, the wall 50 is of such height that it is not seen when the diaphragm is at its lowest point (Fig. 3) but does cover the window opening when the diaphragm is in its uppermost position (Fig. 4).

A compression spring is disposed between the nut flange 45 and the base 47 of the upright cup and the tension on it is varied by turning the screw 41 to adjust the vertical position of the nut.

Once the mean pressure, or the pressure halfway between the high and low pressure is determined, this pressure is applied to the bottom of the normally flat diaphragm when loosely clamped and the screw adjusted to permit the diaphragm to compress the spring just enough to locate the upper edge of the upright cup halfway in the window opening. Thereafter the pressure is relieved, the threaded relation at 21 is further loosened until the center of the diaphragm rests against the bottom of the cavity in which position the edges are again clamped tightly to dispose an expanse of diaphragm over the mouth of the recess greater than the area of the mouth of the recess so that the diaphragm has a predisposition imposed upon it to snap to either side of the plane containing said marginal edges. Thus as the pressure below the diaphragm mounts from the lower to the higher pressure, the diaphragm resists a change of its position until a pressure greater than the mean pressure is reached, and then snaps over to assist in raising and holding the upright cup in its uppermost position, where it again resists reversal of position in a downward direction as the pressure falls.

Spoken of another way, this disposition of the diaphragm so stressed makes it possible to set the high and low pressures closer together with respect to the first stage regulators, so that the output of the second stage regulator is more nearly constant under service conditions, which encounter such conditions as high regulator lock-up pressures and heavy demands for gas imposed upon the system.

In this connection, it is of interest to note that the bottom of the recess 26 in the body is also further recessed as at 60 around the inlet of the passage 25 to leave means defining a contact surface 60a (Fig. 4) so that the effective pressure area of the diaphragm is controlled to prevent excessive lock-up pressures causing a false indication of the system being on the "service" tank when the mean pressure is approached. It will take substantial pressure of long duration to cause the diaphragm to snap upwardly. Such a pressure would be the "high" pressure determined upon.

Thus when the indicator is connected to the common valve chamber of the first stage pressure regulators through the conduit, it will indicate by the exposure of the red inverted cup behind the window that the system is operating upon reserve (low pressure, service tank empty) or by the raising of the green walled cup behind the windows over the red apron that the system is on the service tank (high pressure).

The indicator can therefore be located any place. It can be threaded directly to the first stage regulator housing or connected remotely thereto by small size copper tubing so that it can be seen outside the kitchen window every time somebody looks out the window. Moreover, it will be seen that once the mean pressure is determined and the screw 41 set, the tension imposed upon the spring can be measured by scale displacement downwardly of the head of the screw away from the shoulder 40. Thereafter the tension can be duplicated in other production devices by adjusting the screw until the scale reads the same without need for applying the mean pressure each time.

Although the differential described is from 6 to 12 p. s. i., the differential can be as little as 3 p. s. i. with the device as shown in which the spring rate is 3/16" for 6 p. s. i. differential. A lighter spring between the nut 44 and the base 47 will permit a narrower differential than 3 p. s. i.

Consequently, having described the preferred forms of the invention, it will be readily apparent how the objects are attained and how various other and further changes can be made without departing from the spirit of the invention, the scope of which is commensurate with the appended claims.

What is claimed is:

1. An indicator comprising a body having a recess in the upper face thereof, a passage for connecting said recess to a source of pressure, a resilient diaphragm covering said recess, a bonnet clamping the diaphragm in place and defining a cavity above the diaphragm, the walls of said bonnet having a window therein, a signal element disposed in the top of said cavity extending downwardly behind said window, a second signal element carried by said diaphragm adapted and arranged to appear and disappear outside said first element and behind said window with movement of the diaphragm, and means for urging the diaphragm and the second element in one direction including a screw exposed through the wall of the bonnet and a resilient element between said elements tensioned by said screw, whereby said second element may move a predetermined extent in response to the movement of said diaphragm.

2. A pressure indicator comprising a body having a shallow recess in one face thereof and a passage connecting said recess to a pressure source, a resilient diaphragm arranged on said one face and extending over said recess, a bonnet for clamping the diaphragm in place, said bonnet defining a cavity adjacent said diaphragm, the walls of said bonnet having a window therein, an element slidably arranged within said cavity and movable in response to movement of said diaphragm selectively to extend across said window, a spring for urging said diaphragm and said element in one direction, means for mounting said diaphragm so that it may snap in one direction or the other when the mean spring compression is reached, said means including a screw for varying the compression on said spring whereby the position of said element may be set when the diaphragm is urged in the other direction.

3. A pressure indicator comprising a body having a passage connected to a pressure source and opening into a shallow recess formed in one face thereof, an annular groove formed in the marginal edge of said face, a resilient diaphragm mounted on said marginal edge and extending over said recess, said diaphragm being dimensioned to afford initial stressing of its central portion so that it may move a predetermined distance on either side of said marginal edge, a bonnet for clamping the peripheral edge of said diaphragm to said groove to assure a sealing relation, said bonnet defining a longitudinally extending cavity, the walls of said bonnet having a window therein, a cup of a characteristic color slidably arranged in said cavity and operable when said diaphragm is in one position to cover said window and when said diaphragm is in the other position to uncover said window, a spring for urging said cup and said diaphragm into said other position and means for assuring that said cup will snap from said one position to said other position, said means including a set screw threadedly received in said bonnet for varying the compression of said spring so that sudden movement of said cup is effected in either direction when the mean spring pressure is reached.

4. A pressure indicator comprising a body having a passage connected to a pressure source and opening into a shallow recess formed in one face thereof an annular groove formed in the marginal edge of said face a resilient diaphragm mounted on said marginal edge and extending over said recess, said diaphragm being dimensioned to afford initial stressing of its central portion so that it may move a predetermined distance on either side of said marginal edge, a bonnet for clamping the peripheral edge of said diaphragm to said groove to assure a sealing relation, said bonnet defining a longitudinally extending cavity, the walls of said bonnet having a window therein, a first cup of a characteristic color slidably arranged in said cavity and operable when said diaphragm is in one position to cover said window and when said diaphragm is in one other position to uncover said window, a second cup of an indicative color fixedly mounted within said bonnet and telescopically received within said first cup, a spring for urging said first cup and said diaphragm into said other position and means for assuring that said first cup will snap from said one position to said other position, said means including a set screw threadedly received in said bonnet for varying the compression of said spring so that sudden movement of said first cup is effected in either direction when the mean spring pressure is reached, and the movement of said first cup in said other direction exposes said second cup to indicate a low pressure condition.

5. A pressure indicator comprising a body having a shallow recess in one face thereof, a deeper recess therein and a passage connecting said deeper recess to a source of fluid under pressure, a diaphragm arranged on said face and extending over said shallow recess and having an expanse over the mouth of the shallow recess greater than the area of the mouth of the shallow recess, said expanse normally occupying said shallow recess with the deeper recess disposed therebelow, a bonnet defining a cavity adjacent said diaphragm, the lower portion of said cavity having a width and depth to receive said expanse of the diaphragm when the diaphragm is moved upwardly, the walls of said bonnet above said lower portion having a window therein, an element having a portion slidably arranged within said cavity and a signal area thereon normally disposed to one side of the window and movable in response to movement of said diaphragm to bring the signal area behind said window, a spring for urging said diaphragm and said element in one direction, means for sealing said diaphragm marginally around its edges between said body and bonnet, said expanse of the diaphragm snapping in one direction or the other when the mean spring compression is reached, said means including a screw for varying the compression on said spring to set the mean spring compression in relation to fluid working pressures present in said deeper recess.

6. The combination called for in claim 5 including a transparent hood secured to the bonnet and covering said windows, and means placing said hood in restricted communication with the atmosphere for cushioning the action of said diaphragm.

7. A pressure indicator comprising a body having a recess in one face thereof, stop means upstanding in said recess with a top surface disposed below the margin of the recess and defining a substantial contact area, a passage connecting said recess to a source of fluid under pressures varying throughout a predetermined range, a diaphragm arranged on said face and extending over said recess and having an expanse receivable in said recess to engage the contact area of said stop means in sealed relationship to reduce the diaphragm area exposed to said fluid under pressure when said expanse is engaging said stop means, a bonnet defining a cavity adjacent said diaphragm, means for sealing said diaphragm marginally around its edges between said body and bonnet, means for resiliently urging said expanse into engagement with said stop means, the lower portion of said cavity having a width and depth to receive said expanse of the diaphragm when the diaphragm is moved upwardly, the walls of said bonnet above said lower portion having a window therein, an element having a portion slidably arranged within said cavity and a signal area thereon normally disposed to one side of the window and movable in response to movement of said diaphragm to bring the signal area behind said window, said expanse of the diaphragm and said element snapping away from said stop means when the effort of said fluid under pressure upon said expanse of diaphragm not sealed by said contact area exceeds the effort of said resiliently urging means in maintaining said engagement with said contact area, and means for varying the effort of said resiliently urging means in relation to said predetermined range of fluid pressures.

8. The combination called for in claim 7 in which said expanse over the mouth of the recess is greater than the area of the mouth of said recess to rest against said stop means in one position of its movement.

References Cited in the file of this patent

UNITED STATES PATENTS

| 1,610,452 | Kennedy | Dec. 14, 1926 |
| 1,644,193 | Kennedy et al. | Oct. 4, 1927 |